US007673169B1

(12) United States Patent
Kumaresan et al.

(10) Patent No.: US 7,673,169 B1
(45) Date of Patent: Mar. 2, 2010

(54) TECHNIQUES FOR IMPLEMENTING AN ADAPTIVE DATA ACCESS ERROR HANDLING POLICY

(75) Inventors: Bala Kumaresan, East Palo Alto, CA (US); Craig Harmer, San Francisco, CA (US); Ajay Salpekar, Hayward, CA (US); Jonathan Purcell, St. Albans (GB); Ashish Yajnik, Newark, CA (US); Joseph Maionchi, Vallejo, CA (US)

(73) Assignee: Symantec Corporation, Cupertino, CA (US)

(*) Notice: Subject to any disclaimer, the term of this patent is extended or adjusted under 35 U.S.C. 154(b) by 442 days.

(21) Appl. No.: 11/746,420

(22) Filed: May 9, 2007

(51) Int. Cl.
*G06F 11/00* (2006.01)
(52) U.S. Cl. .............................. 714/4; 714/5
(58) Field of Classification Search ............. 714/4, 714/5
See application file for complete search history.

(56) References Cited

U.S. PATENT DOCUMENTS

| 5,893,140 | A | 4/1999 | Vahalia et al. | |
|---|---|---|---|---|
| 5,950,199 | A | 9/1999 | Schmuck et al. | |
| 6,023,744 | A | 2/2000 | Shoroff et al. | |
| 6,058,400 | A | 5/2000 | Slaughter | |
| 6,983,362 | B1* | 1/2006 | Kidder et al. | 713/1 |
| 6,985,914 | B2 | 1/2006 | Venkatesh et al. | |
| 7,107,328 | B1 | 9/2006 | Muthiyan et al. | |
| 7,340,639 | B1* | 3/2008 | Lee et al. | 714/6 |
| 2004/0133539 | A1 | 7/2004 | Talagala et al. | |
| 2005/0022047 | A1* | 1/2005 | Chandrasekaran | 714/4 |
| 2005/0273645 | A1* | 12/2005 | Satran et al. | 714/4 |
| 2006/0149995 | A1* | 7/2006 | Kondajeri et al. | 714/5 |
| 2006/0282471 | A1 | 12/2006 | Mark et al. | |
| 2007/0294563 | A1* | 12/2007 | Bose | 714/5 |
| 2008/0301491 | A1* | 12/2008 | Jones et al. | 714/4 |

OTHER PUBLICATIONS

Network Working Group, "NFS: Network File System Protocol Specification," Sun Microsystems, Inc., Mar. 1989 (ftp://ftp.rfc-editor.org/in-notes/rfc1094.txt), pp. 1-26.
Soltis, Steven R. et al., "The Global File System: A File System for Shared Disk Storage," *IEEE Transactions on Parallel and Distributed Systems*, Nov. 12, 1997, pp. 1-40.
Installation and Administration Guide, Veritas Storage Foundation, Cluster File System 4.1, HP Serviceguard Storage Management Suite Extracts, N16826G HP Part No. T2771-90009, published Jun. 2005 Extracted Dec. 2005, pp. i-xii and 1-128.
Veritas Storage Foundation, Cluster File System, Administrators Guide—Linux 5.0, Symantec, 2006.
Sun Cluster 3.0 Software Cluster File System (CFS): Making the Most of the Global File Service, Technical White Paper, Sun Microsystems, Inc., 2001.

\* cited by examiner

*Primary Examiner*—Marc Duncan
(74) *Attorney, Agent, or Firm*—Hunton & Williams LLP

(57) ABSTRACT

Techniques for implementing an adaptive data access error handling policy are disclosed. In one particular exemplary embodiment, the technique may be realized as a system comprising a shared storage device communicatively coupled to a network, and a computer cluster communicatively coupled to the network, the computer cluster comprising a plurality of nodes each mounting a shared file system thereon, a first node of the plurality of nodes to send a data access request to the shared storage device, to identify a data access error associated with the data access request, and to determine whether to permit access to the shared file system based on the data access error being a local data access error or a global data access error.

19 Claims, 8 Drawing Sheets

TECHNIQUES FOR IMPLEMENTING AN ADAPTIVE DATA ACCESS ERROR HANDLING POLICY

FIELD OF THE DISCLOSURE

The present disclosure relates generally to handling of input/output errors and, more particularly, to techniques for implementing an adaptive data access error handling policy.

BACKGROUND OF THE DISCLOSURE

In the enterprise arena, the storage and clustering community is concerned with issues of high availability, load balancing, and support for parallel applications. One way to address the above issues is through shared data clusters. In a storage area network (SAN), multiple hosts are connected to each other and to a common set of storage devices. The hosts attached to the storage area network (SAN) are allowed to read and write data concurrently with full data coherency to the common set of storage devices. The hosts share data amongst themselves, while attempting to maintain data consistency and data coherency along with satisfactory data availability and load balancing.

In conventional storage area network (SAN) environments, stable storage connectivity for clustered nodes is very critical for shared and parallel access of data. Shared data clusters enable critical business applications to take advantage of the aggregate capacity of multiple servers in an attempt to provide maximum possible data throughput and performance during peak processing periods. Stable storage connectivity is achieved by zoning storage devices so that there is a consistent view of the storage to all nodes in the cluster. Cluster aware applications strive to provide its clients uninterrupted data availability from all nodes in the cluster. In the event of a hardware malfunction or software denial of service on a host, the shared data cluster may seamlessly move the applications to other properly functioning nodes of the cluster.

The problems with the state of the art in conventional cluster aware applications are that, under certain failures scenarios, cluster aware applications may not be able to make data available to its clients. In almost all cluster configurations, shared storage is connected to cluster nodes via a Storage Area Network (SAN). In a Storage Area Network environment, it is not uncommon to have failures which are localized to one or more cluster nodes instead of to a whole cluster. It is also possible that a failure is localized to one or some of the storage devices (and hence to only part of the data) instead of to all of the storage devices. Due to hardware (e.g., switches, routers) malfunction, nodes in the cluster can have inconsistent views of the shared storage devices. This results in inconsistent behavior to an end-user who might get input/output (i/o) errors on some nodes and not on others.

Cluster aware applications do not satisfactorily determine the nature of failures and the nature of data distribution in underlying storage devices. Conventional systems may implement an i/o error policy that disables a file system on all nodes in the cluster for any i/o error. Such a policy is not desirable if the i/o error is only encountered at less than all of the nodes, at a subset of data stored at a particular storage device, or at a subset of the storage devices. This type of i/o error policy makes availability of the file system depend on the reliability of the least reliable storage device and/or node. An i/o error policy of continuing to make a file system available when encountering data i/o errors, however, is also not desirable if the failure is local to a node and there are other nodes that can serve the data without any i/o errors.

In view of the foregoing, it would be desirable to provide an adaptive data access error handling technique for identifying the nature of a failure and the nature of data distribution which overcomes the above-described inadequacies and shortcomings.

SUMMARY OF THE DISCLOSURE

Techniques for implementing an adaptive data access error handling policy are disclosed. In one particular exemplary embodiment, the techniques may be realized as a system for implementing an adaptive data access error handling policy comprising a shared storage device communicatively coupled to a network, and a computer cluster communicatively coupled to the network, the computer cluster comprising a plurality of nodes each mounting a shared file system thereon, a first node of the plurality of nodes to send a data access request to the shared storage device, to identify a data access error associated with the data access request, and to determine whether to permit access to the shared file system based on the data access error being a local data access error or a global data access error.

In accordance with other aspects of this particular exemplary embodiment, there is shown a method for implementing an adaptive data access error handling policy comprising the steps of providing a computer cluster comprising a first node and a second node, a shared file system being locally mounted on the first node and on the second node, sending a data access request from the first node to a shared storage device, identifying a data access error at the first node based on a response to the data access request, and determining whether to permit access to the shared file system based on the data access error being a local data access error or a global data access error.

In accordance with further aspects of this particular exemplary embodiment, there is shown an article of manufacture for implementing an adaptive data access error handling policy, the article of manufacture comprising at least one processor readable carrier, and instructions carried on the at least one carrier, wherein the instructions are configured to be readable from the at least one carrier by at least one processor and thereby cause the at least one processor to operate so as to: mount a shared file system on a first node and on one or more other nodes, send a data access request from the first node to a storage device, identify a data access error at the first node based on the data access request, and determine whether to permit access to the shared file system based on the data access error being a local data access error or a global data access error.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

The impact of data access errors (i.e., input/output (i/o) errors) on data availability for a distributed file system in a clustered environment can be minimized by finding and knowing the nature of the i/o errors (e.g., global or local failures). An adaptive data access error handling policy in accordance with exemplary embodiments of the present disclosure can take the nature of an i/o error into account to accomplish the best possible availability of the data while maintaining a high probability of providing error free access to the data. The adaptive data access error handling policy in accordance with exemplary embodiments of the present disclosure may process information from lower layers in a storage software stack to help in continuing to make data available to clients from as many cluster nodes as possible. The adaptive data access error handling policy in accordance with exemplary embodiments of the present disclosure improves on policies that disable a shared file system on all nodes in a cluster when any data access error (i.e., i/o error) is encountered.

Figure 1:
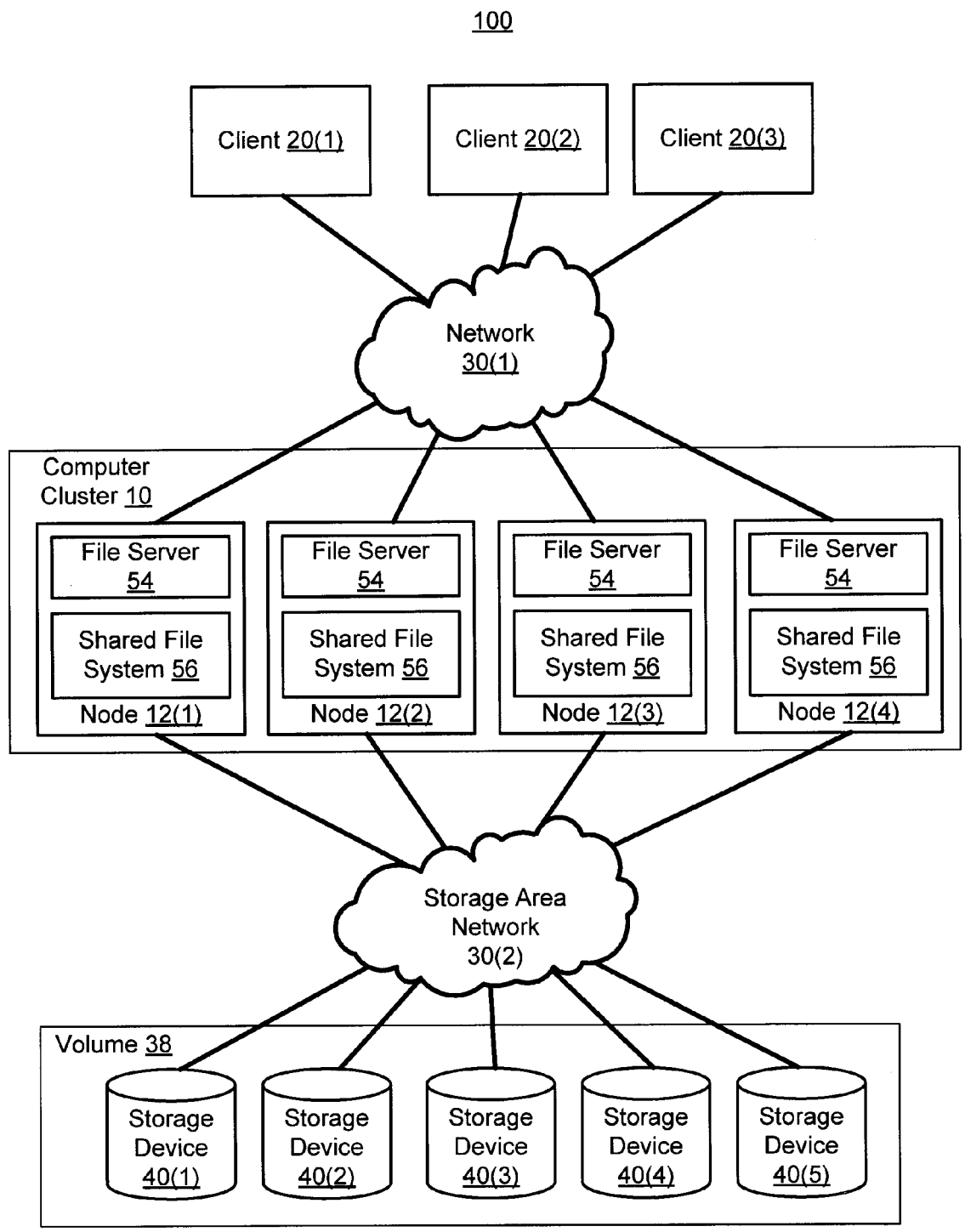
FIG. 1 shows a block diagram of a data processing system that includes a computer cluster in accordance with an embodiment of the present disclosure.

Referring to FIG. 1, there is shown a block diagram of a data processing system 100 that includes computer cluster 10 in accordance with an embodiment of the present disclosure. In this embodiment, the computer cluster 10 includes four nodes, nodes 12(1)-(4). In an exemplary embodiment, the computer cluster 10 may be a filer server cluster. The number of nodes 12 in the computer cluster 10 is exemplary; the computer cluster 10 may include two or more nodes that are remote or local to one another. The computer cluster 10 also may include the client nodes 20. Each of the nodes 12(1)-(4) can include a computing device, such as a personal computer, server, cell phone, or other computing device. In some embodiments, several nodes may be implemented in a single physical computing device. For example, a multiprocessor computer system can be subdivided into several virtual machines, each of which is used to implement one of the nodes 12 in the computer cluster 10. The nodes 12(1)-(4) may communicate with one another by one or more networks (not shown in FIG. 1). For example, nodes 12(1)-(4) can be coupled by one or more Local Area Networks (LANs) and/or Wide Area Networks (WANs). Additionally, the nodes 12(1)-(4) can be coupled by one or more private networks. In some embodiments, one or more private networks may be used to communicate cluster-specific messages, such as heartbeat messages and messages effecting cluster membership, among the nodes 12(1)-(4).

Several clients 20(1)-(3) are connected to the computer cluster 10 by network 30(1). Each client 20 may be a computing device. The network 30(1) can include a local area network (LAN) or wide area network (WAN), such as the Internet, or a combination of one or more different types of networks. Various media can be used to implement the network 30(1), including Ethernet links, wireless links, wired links, or other types of links. It is noted that other embodiments can include more or fewer than three clients 20. Additionally, nodes 12 within the computer cluster 10 can also be clients of the computer cluster 10.

The computer cluster 10 may be coupled to a volume 38 by a storage area network 30(2). Storage area network 30(2) also can include a LAN, WAN, or some combination of networks. In an exemplary embodiment, the volume 38 may include multiple storage devices 40(1)-(5). It is noted that other embodiments can include more or fewer than five storage devices 40. Each storage device 40 may be a logical storage device that is presented by a storage virtualization component (not shown) such as VERITAS Volume Manager™ (in alternative embodiments, however, each storage device 40 can be a physical storage device). A storage virtualization component, which can be implemented in hardware, software, or a combination of the two, may manage the storage devices 40 of the volume 38. Applications such as databases and file systems may view and access storage devices 40 managed by the storage virtualization component in the same way that the applications would view and access a physical storage device.

A physical storage device can be a single device (e.g., a single hard drive, Compact Disc (CD) drive, or Digital Versatile Disc (DVD) drive). Alternatively, a physical storage device can include an array of such devices (e.g., a Redundant Array of Independent Disks (RAID) including an array of several hard drives controlled by a hardware array controller). Also, portions of more than one data volume can be implemented on the same physical storage device.

Each node 12(1)-(4) can implement a file server 54 and a shared file system 56. For example, each node 12(1)-(4) can include one or more computing devices that are configured to execute software implementing the file server 54 and the shared file system 56. Alternatively, each node 12(1)-(4) can be implemented as a logic device configured to perform the functions of the file server 54 and the shared file system 56. Nodes 12(1)-(4) can also be implemented using logic devices that are configured to perform some of the functions of the file server 54 and/or the shared file system 56.

The file server 54 may be an application, such as, but not limited to, a Network File System (NFS), that serves application data and metadata associated with application data from one or more of the storage devices 40(1)-(5) to one or more of the clients 20(1)-(3) or to other nodes 12. Application data may refer to data used by an application. Metadata can refer to data about the application data including, but not limited to, how, when, and where the application data was created, accessed, modified, and/or deleted. For example, metadata may be data about the properties, characteristics, and attributes of the application data. Metadata also may be structured, encoded data, that describe characteristics of the application data to aid in the identification, discovery, assessment, and management of the application data. When the file server 54 provides a client 20 with access to a shared file system 56 having data (i.e., application data and/or metadata) stored on one of the storage devices 40(1)-(5), the file server 54 may export that shared file system 56 to the client 20. When a client 20 accesses the exported shared file system 56 via the file server 54, that client 20 can access the files within the exported shared file system 56 as if those files were stored locally at the client 20.

The shared file system 56 organizes data within the storage devices 40(1)-(5) into files and/or directories. The particular set of one or more directories and/or files that the shared file system 56 organizes is referred to herein as a "file system". It is noted that a file system initially may not include any user files (e.g., when the file system is created, the file system may include only a single file, which defines the root directory of the file system).

The shared file system 56 may be an application, such as, but not limited to, VERITAS's cluster file system (CFS), that allows one or more nodes 12 within the computer cluster 10 to simultaneously mount the same file system, such that each node can concurrently access the file system. The shared file system 56 may manage access to the files within the shared file system 56. For example, when an application executing on the client 20 requests access to a file in one or more of the storage devices 40(1)-(5), the shared file system 56 may translate the application's request into an appropriate block-level operation at the storage device 40. For example, shared file system 56 may read and/or write application data and/or metadata from/to the storage device 40 based on a request received from the application executing on the client 20.

The shared file system 56 enables multiple nodes 12 to mount and perform operations concurrently on the same file system, as if all of the operations were being performed by a single device. Thus, nodes 12(1)-(4) can all mount the same shared file system from the volume 38 at the same time (this feature of shared file system 56 is referred to as a shared mount), and all nodes 12(1)-(4) can concurrently perform operations on the same file within that shared file system. Accordingly, instances of the file server 54 on different nodes can concurrently serve file data from the storage devices 40 to the clients 20. In some embodiments, ownership of the shared file system is shared among the nodes 12 within the cluster file system 10 that are currently mounting the shared file system.

Each node 12(1)-(4) may access application data and metadata stored on different storage devices 40(1)-(5). As shown, node 12(1) may access the data (e.g., application data, metadata) on any of storage devices 40(1)-(5), and node 12(2) may access the data on any of storage devices 40(1)-(5), and so forth. Storage devices 40(1)-(5) may store replicas of the file system data such that the file system data is consistent across the storage devices 40(1)-(5). Data within storage devices 40(1)-(5) may also be replicated at the file system level (e.g., each time a file is modified on one storage device, a copy of the file on the other storage devices is updated to reflect the modification) or at the block level (e.g., each time a block of data is modified on one storage device, a copy of the block of data on the other storage devices is updated to reflect the modification). The storage devices 40(1)-(5) may also store different application data and metadata that is unique to each of the storage devices 40(1)-(5).

Figure 2:
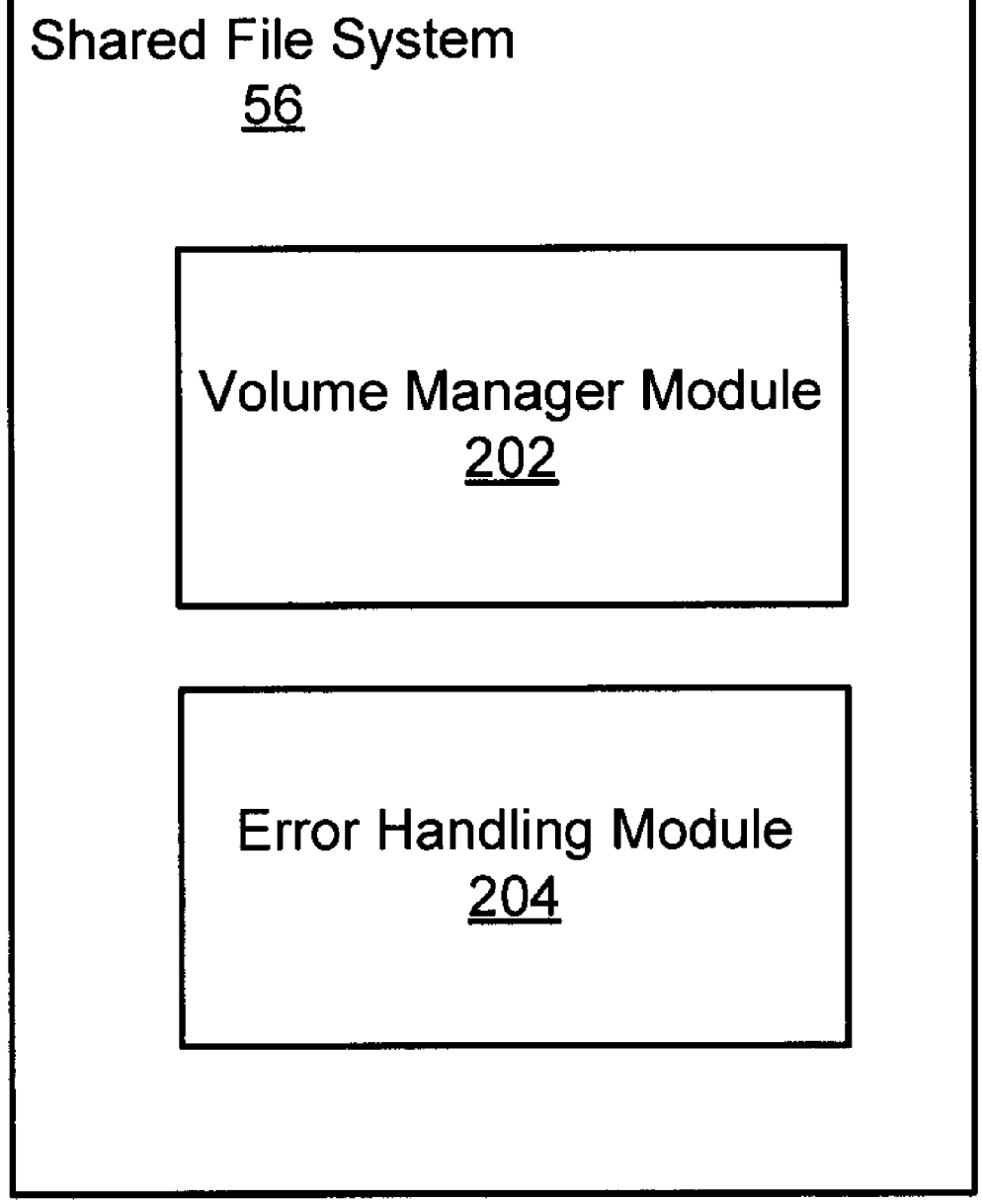
FIG. 2 shows a volume manager module and an error handling module included in a shared file system in accordance with an embodiment of the present disclosure.

Referring to FIG. 2, there is shown a volume manager module 202 and an error handling module 204 included in the shared file system 56 in accordance with an embodiment of the present disclosure. The volume manager module 202 and the error handling module 204 may be hardware, executable software, firmware, and/or combinations thereof implemented at each node 12(1)-(4). The volume manager module 202 and the error handling module 204 implemented at one node 12 may communicate with volume manager modules 202 and error handling modules 204 implemented at other nodes 12.

The volume manager module 202 may generate and send input/output (i/o) data access requests to read and/or write application data and/or metadata data to and from one or more of the storage devices 40(1)-(5). When an application running on a client device 20 wants to access data stored at one or more storage devices 40, the application may communicate a data request to the shared file system 56. The data request may identify a path of the data.

The volume manager module 202 may process the path to identify a storage location of the data. The volume manager module 202 may translate the path to identify on which storage device 40 the requested data is stored. For example, the volume manager module 202 may translate the path received from the client 20 to an inode number, which may indicate in the file system where the data resides, of a Unix-style file system. Other non-Unix-style file systems also may be used.

The data request also may indicate a type of the data requested. The type of the data may indicate whether the application is requesting metadata and/or application data. Once the storage location of the data is identified, the volume manager module 202 may communicate a data access request to the appropriate storage device(s) 40 to access (e.g., read/write) the requested data (e.g., metadata and/or application data).

Several different events may occur after the volume manager module 202 sends the data access request to the appropriate storage device(s) 40 to access the requested data. If the node 12 requesting to access the data, the components of the storage area network 30(2) between the node 12 and the storage device 40, and the storage device 40 are functioning properly, the storage device 40 may process the data access request and may perform the function (e.g., read and/or write) requested by the volume manager module 202. If the storage device 40 receives the request but is unable to process the data access request, the storage device 40 may respond to the volume manager module 202 with an error message that identifies an i/o error. The error message may indicate the type of error. For example, the error message may indicate a failed read or a failed write. In another example, the error message may indicate that the storage device 40 was unable to retrieve the data due to a bad hard drive sector. If a problem occurs on the network 30(2), thus preventing the storage device 40 from receiving the request, the storage device 40 may not respond to the data access request due to never receiving the data access request.

Referring again to FIG. 2, the error handling module 204 of the shared file system 56 of the respective nodes 12 may implement an adaptive data access error handling policy to identify and respond to i/o errors from the volume manager module 202 attempting to access data from the storage device 40. The adaptive data access error handling policy in accordance with an embodiment of the present disclosure may involve multiple nodes 12 communicating with one another to identify various types of information about the i/o error. For example, the error handling module 204 of one node 12 may communicate with error handling modules 204 at one or more other nodes 12 to identify i/o errors and to determine whether an i/o error is being experienced globally by all of the nodes 12 or locally at one or a less than all of the nodes 12.

Figure 3:
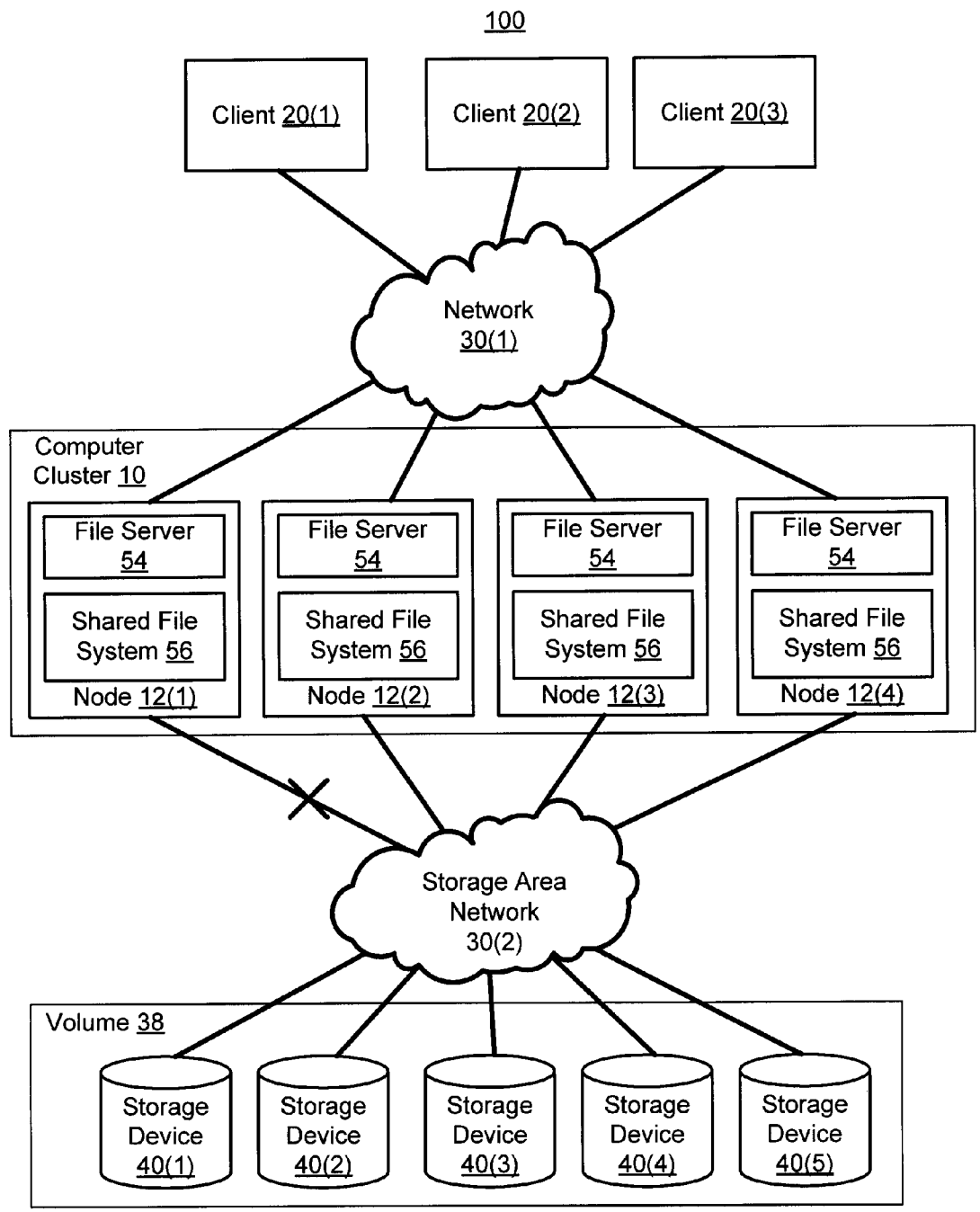
FIG. 3 shows a failure local to a node of a computer cluster in accordance with an embodiment of the present disclosure.

Referring to FIG. 3, there is shown a failure local to node 12(1) of the computer cluster 10 in accordance with an embodiment of the present disclosure. Local failures may make data stored at any of the storage devices 40 inaccessible to one or more of the nodes 12 experiencing the local failure.

A failure local to a particular node 12 may happen for several reasons such as, but not limited to, a link failure between the node 12 and the storage area network 30(2), an erroneous configuration of the storage area network 30(2) (e.g. zoning, Logical Unit Number (LUN) masking, etc.), or other failures that may inhibit the ability of the node 12 to communicate with the storage area network 30(2). In an exemplary embodiment, FIG. 3 shows a failure localized to node 12(1). The failure is depicted as an "X" over a link between the node 12(1) and the storage area network 30(2). In this exemplary embodiment, the node 12(1) is unable to serve data from any of the storage devices 40(1)-(5) due to the failed link. All other nodes 12(2)-(4), however, may continue to serve data to their clients 20 from any of the storage devices 40(1)-(5). Local failures also may occur at the storage devices 40.

Figure 4:
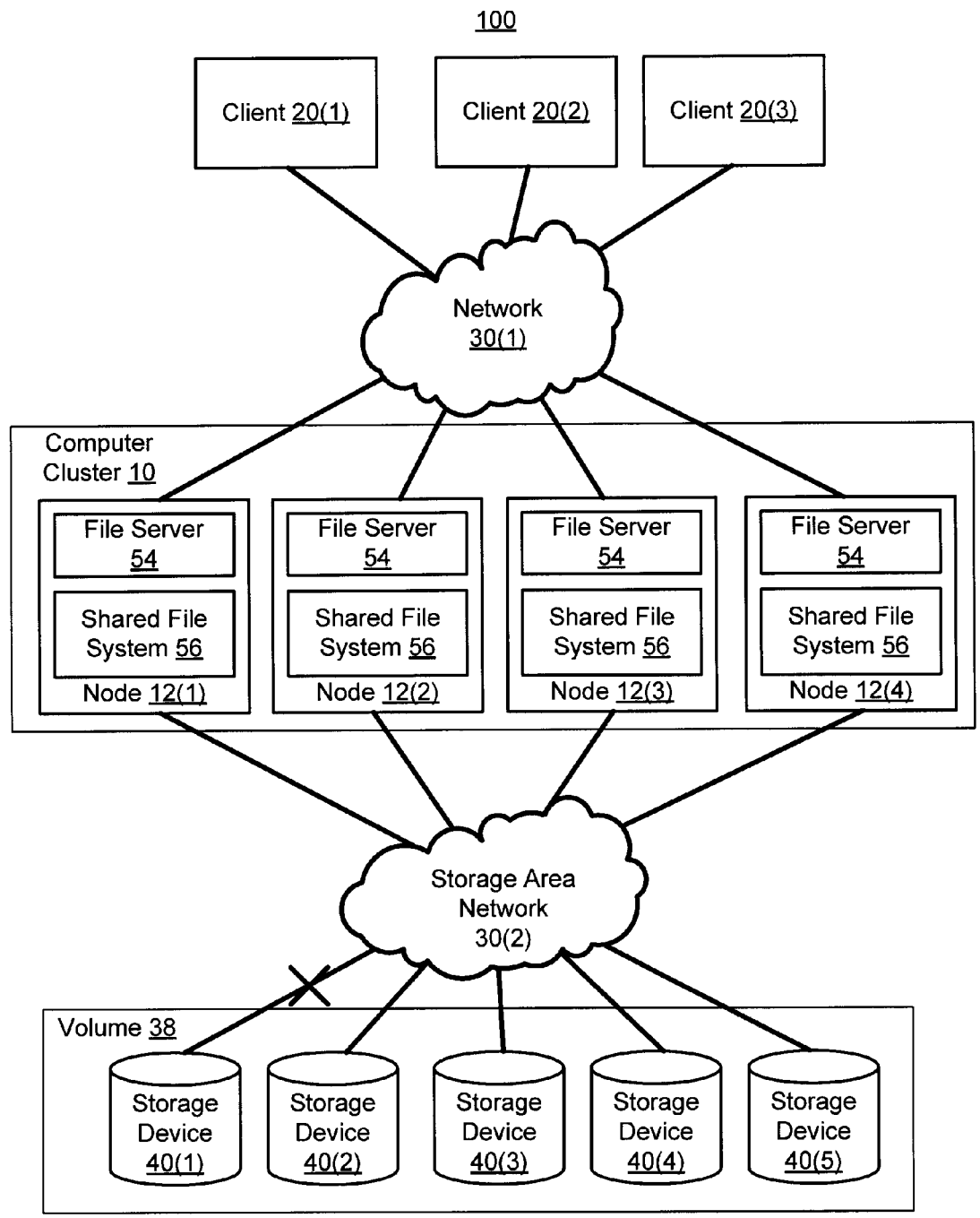
FIG. 4 shows a failure localized to a storage device in accordance with an embodiment of the present disclosure.

Referring to FIG. 4, there is shown a failure localized to one of the storage devices 40 in accordance with an embodiment of the present disclosure. Failures localized to one of the storage devices 40 may make part of the data stored therein unavailable to one or more cluster nodes 12. Failures localized to one of the storage devices 40 may be caused by, for example, an erroneous configuration of the storage area network 30(2), media errors, storage controller failures, etc., or other failures that may prevent a storage device 40 from being able to respond to requests to access and/or modify data stored thereon. FIG. 4 illustrates a failure localized to the data stored in storage device 40(1). The failure is depicted as an "X" over a link between the storage device 40(1) and the storage area network 30(2). In this exemplary embodiment, a link between the storage device 40(1) and the storage area network 30(2) has failed and none of the nodes 12 can access the data stored at storage device 40(1). Cluster nodes 12(1)-(4) can continue to serve data stored in the other storage devices 40(2)-(5). Failures also may occur due to erroneous configurations.

Figure 5:
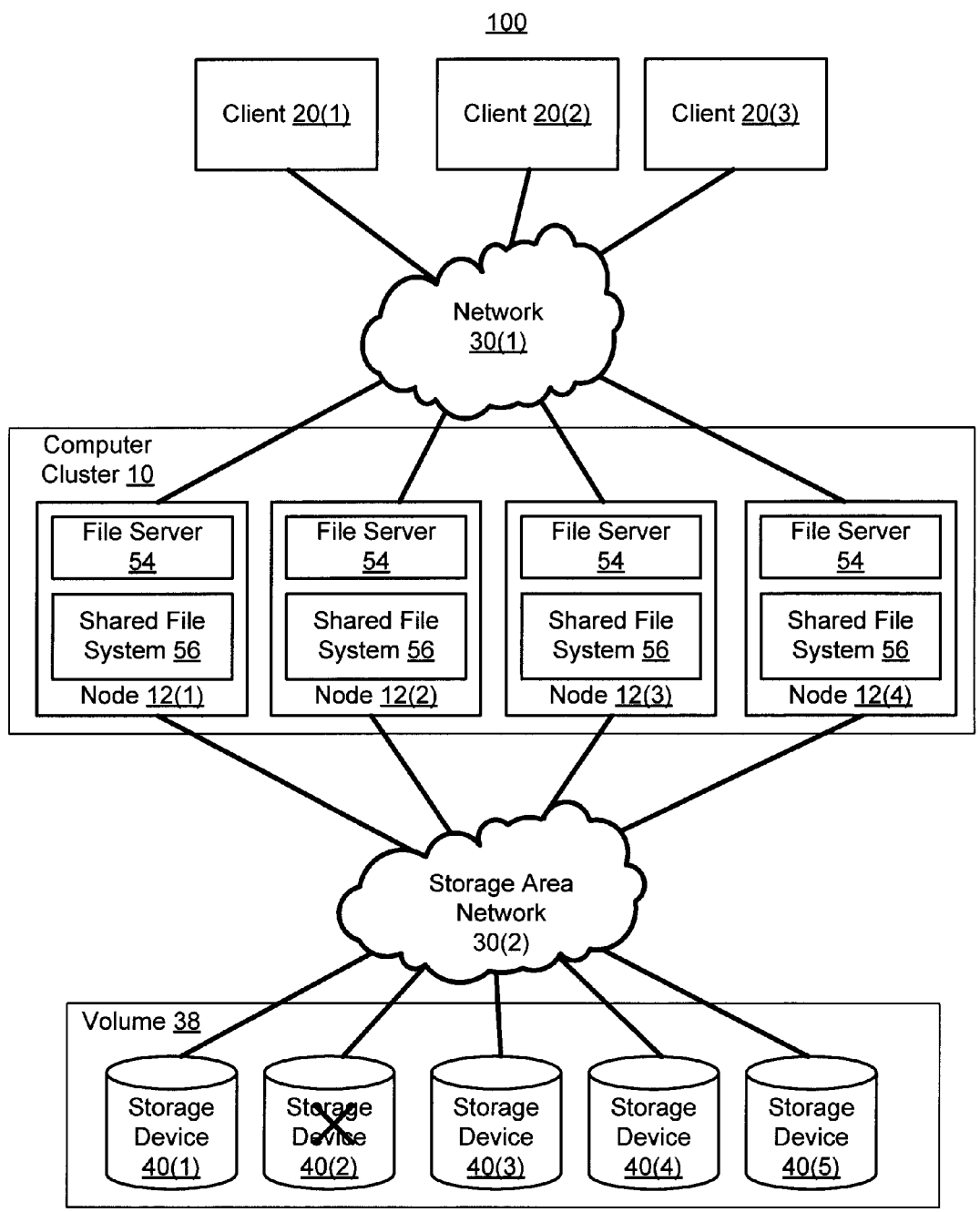
FIG. 5 shows a failure such that part of the data is inaccessible to a certain node, while other nodes can continue to access the same part of the data in accordance with an embodiment of the present disclosure.

Referring to FIG. 5, there is shown a failure such that part of the data is inaccessible to a certain node, while other nodes can continue to access the same part of the data in accordance with an embodiment of the present disclosure. In this situation, a failure is localized to part of the data and/or to a certain set of the cluster nodes 12. FIG. 5 illustrates an example where due to erroneous Logical Unit Number (LUN) masking, a storage device 40(2) is not accessible to cluster node 12(2). The failure is depicted as an "X" over the storage device 40(2). The failure is a logical failure, as opposed to a physical failure. The physical hardware of the storage device 40(2) functions properly, but due to the logical failure, the node 12(2) cannot access data stored on the storage device 40(2). In this exemplary embodiment, the logical failure is a configuration error. The nodes 12(1) and 12(3)-(4) may continue to serve all data from/to all of the storage devices 40(1)-(5), and node 12(2) may continue to serve all data from/to storage devices 40(1) and 40(3)-(5), all of which are part of the shared file system, but not from storage device 40(2). Failures also may occur that globally affect all nodes 12 of the computer cluster 10.

Figure 6:
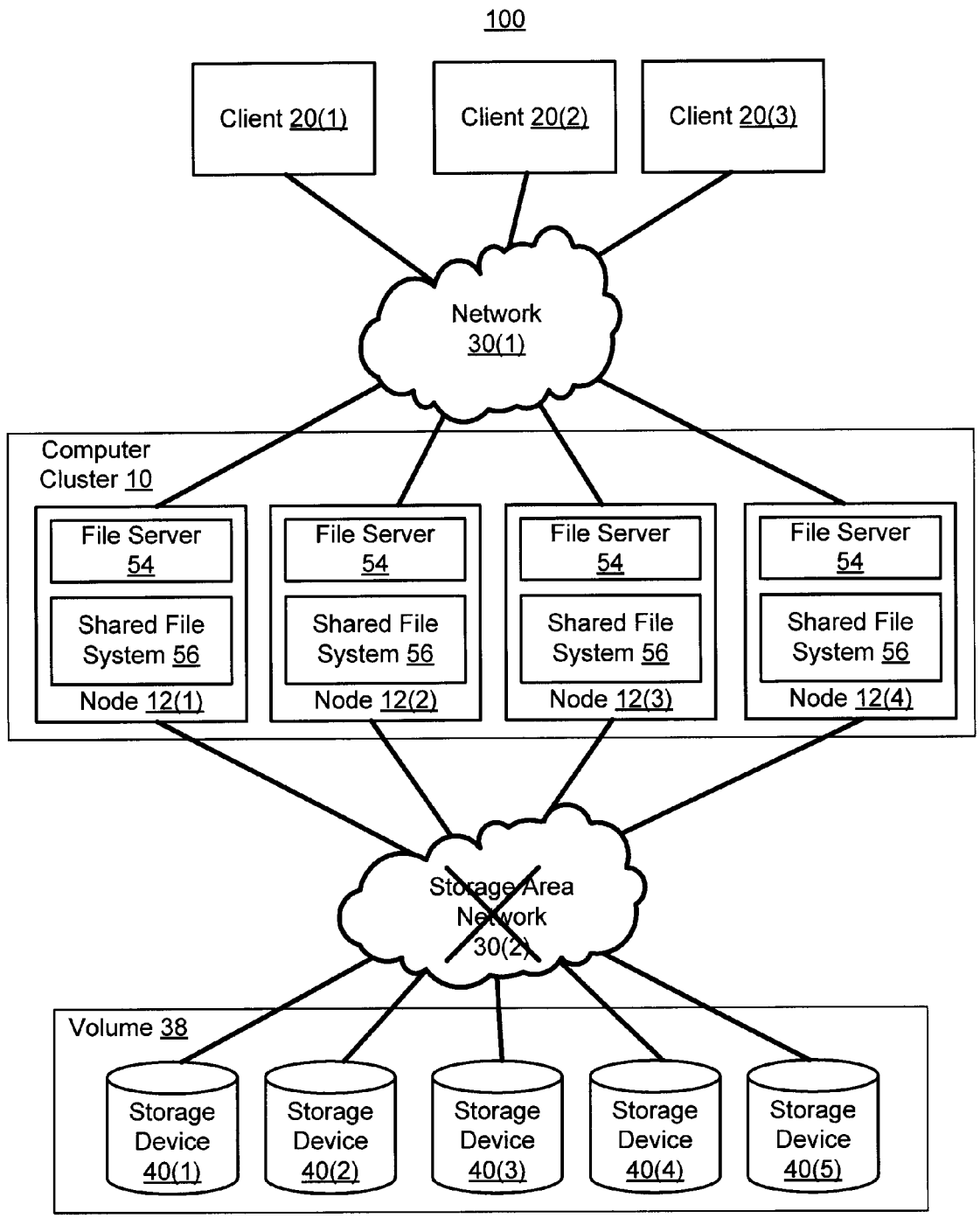
FIG. 6 shows a global failure such that all nodes of a computer cluster cannot access any data stored at shared storage devices in accordance with an embodiment of the present disclosure.

Referring to FIG. 6, there is shown a global failure such that the nodes 12(1)-(4) cannot access any of the data stored at any of the storage devices 40(1)-(5) in accordance with an embodiment of the present disclosure. In this embodiment, some network element (e.g., switch, router) on the storage area network 30(2) fails between all of the nodes 12(1)-(4) and all of the storage devices 40(1)-(5). The failure is depicted as an "X" over the storage area network 30(2) indicating a failure of a network element through which all of the nodes 12(1)-(4) use to communicate with the storage devices 40(1)- (5). Because of the failure, all nodes 12(1)-(4) are unable to serve data to and/or from any of the storage devices 40(1)-(5).

Referring again to FIG. 2, the error handling module 204 may identify and process local and global i/o errors to provide satisfactory availability while maximizing the probability of providing an application error free access to data. The error handling module 204 at a particular node 12 may identify an i/o error based on receiving an error message from a storage device and/or based on not receiving a response to a data access request from a storage device 12 within a predetermined amount of time.

When an i/o error is identified, the error handling module 204 may determine whether the i/o error is a read or write (read/write) i/o error on metadata, or is a read or write (read/write) i/o error on application data. The error handling module 204 may identify a read/write i/o error on metadata based on a previously sent data access request that requested to read metadata from or to write metadata to a storage device 40. The error handling module 204 may identify a read/write i/o error on application data based on a previously sent data access request that requested to read application data from or write application data to a storage device 40.

In addition to identifying the type of i/o error, the error handling module 204 may determine whether to permit access to the shared file system 56 locally mounted on the node 12 encountering the i/o error based on whether the data i/o error is a local data i/o error on application data or is a global data i/o error on application data. In an exemplary embodiment, the error handling module 204 may determine whether the data i/o error is a local i/o error or is a global data i/o error based on communicating with the other nodes 12 of the computer cluster 10. In an exemplary embodiment, the error handling module 204 may determine a membership of the nodes 12 having the same shared file system 56 mounted thereon and a membership of the nodes 12 that encounter the same i/o error (e.g., read/write i/o error on metadata and/or read/write i/o error on application data).

To identify a membership of the nodes 12 that have the same shared file system 56 mounted, the error handling module 204 of the node 12 encountering the i/o error may broadcast a membership message to the error handling modules 204 of the other nodes 12. The membership message may include a file system identifier identifying the shared file system, and also may include a data access request that is associated with the i/o error. The error handling module 204 of the broadcasting node (e.g., node 12(1)) may request that some or all of the error handling modules 204 of the other nodes (e.g., nodes 12(2)-(4)) perform a data access request to attempt to access the data of the shared storage device 40 that is associated with the i/o error.

Each of the other nodes 12 that have the shared file system mounted corresponding to the file system identifier may receive the membership message and the respective error handling modules 204 may attempt to access the data at the storage location specified in the membership message. The respective error handling modules 204 may respond to the membership message with a response message. The response message may indicate that the node 12 is a member of the cluster, and may indicate whether the volume manager modules 202 of the member nodes 12 could successfully access the data that is associated with the i/o error. In an exemplary embodiment, the error handling module 204 of node 12(1) may broadcast a membership message after failing to access application data at storage device 40(1). Each of nodes 12(2)-(4) may receive the membership message and each may have the shared file system 56 mounted thereon. Each of the nodes 12(2)-(4) may attempt to access the application data stored at the storage device 40(1) and may respond with a response message indicating whether the respective nodes 12(2)-(4) were successful in accessing the application data. Based on whether the other nodes (e.g., nodes 12(2)-(4)) may access the application data that is associated with the i/o error, the error handling module 204 of the broadcasting node (e.g., node 12(1)) may determine whether the i/o error is due to a local or global failure.

The error handling module 204 may store a member list indicating all of the nodes 12 having the shared file system 56 mounted and an error list indicating all of the member nodes 12 that encountered the same i/o error. The error handling module 204 of the node 12 originally encountering the i/o error may communicate the member list and the error list to the other member nodes 12. Based on the member list and on the error list, the shared file system 56 of the respective nodes 12 may respond to the i/o errors based on an error handling policy.

The error handling policy may be a set of rules indicating how the shared file system 56 handles i/o errors. The shared file system 56 may query the error handling module 204 to identify the member list and the error list. The shared file system 56 may use the member list and the error list to identify the nature of the i/o error encountered by the node 12.

The error handling policy may differentiate between read/write i/o errors on metadata, read/write i/o errors on application data, and whether the i/o errors are local or global. The shared file system 56 may identify a data access error as being a local i/o error if the error list indicates that a single node 12 or a subset of the nodes 12 of the computer cluster 10 having the shared file system 56 mounted thereon encounter the same i/o error. The shared file system 56 may identify an error as being a global i/o error if the error list indicates that all nodes 12 of the computer cluster 10 having the shared file system 56 mounted thereon encounter the same i/o error.

Once the shared file system 56 has determined whether the i/o error is a global i/o error or a local i/o error, the shared file system 56 may respond to the i/o error according to the error handling policy. The error handling policy may indicate whether each node 12 may permit access to the shared file system 56 locally mounted thereon based on whether the i/o error is a local data i/o error or is a global data i/o error.

If the shared file system 56 determines that, based on the error list and on the member list, the i/o error is a read/write i/o error on metadata, for both local and global i/o errors, the shared file system 56 of each node 12 encountering the i/o error may locally disable the shared file system 56. The shared file system 56 may inform the application of the client 20 requesting the metadata about the i/o error. The application of the client may then determine whether to contact another node 12 to attempt to access the metadata if the i/o error is a local i/o error.

If the shared file system 56 determines that, based on the error list and on the member list, the i/o error is an read/write i/o error on application data and that the i/o error is a failure local to one or more of the nodes 12, the shared file system 56 of each of the nodes 12 seeing the local failure may locally disable the shared file system 56 as a better alternative exists for failing over the application of the client 20 that uses the shared file system 56. Failing over may refer to an application of the client 20 automatically switching over to another node 12 upon the failure or abnormal termination of the previously active node 12. For example, if a shared file system 56 is mounted on nodes 12(1)-(4), and nodes 12(2)-(4) do not encounter the read/write i/o error on application data encountered by node 12(1), then the shared file system 56 of node 12(1) may locally disable the shared file system 56 as the application of the client 20 would have a better fail over alternative of accessing the shared file system 56 through any of the other nodes 12(2)-(4).

If the shared file system 56 determines that, based on the member list and on the error list, that some, but not all, of the nodes 12 of the file cluster server 10 have the shared file system 56 mounted thereon, and all of the nodes 12 that have the shared file system 56 mounted encounter the same read/write i/o error on application data, then the shared file system 56 at each of the nodes 12 may continue to make the shared file system 56 available. For example, the computer cluster 10 may include nodes 12(1)-(4), and nodes 12(1)-(2) may have the shared file system 56 mounted thereon. If both nodes 12(1)-(2) encounter the same application data read/write i/o error, the shared file system 56 of both nodes 12(1)-(2) may continue to make the shared file system 56 available. Disabling the shared file system 56 in this scenario would make all data unavailable, which is not desirable. Partial availability of data in this scenario is the best availability the shared file system 56 can offer.

For example, the storage nodes 40(1)-40(5) may not all be of the same quality and the shared file system 56 may store highly critical data on a highly reliable (e.g., expensive) storage device 40 (e.g., storage device 40(1)). If errors are encountered on a storage device 40(2) which is, for example, a less reliable storage device used by the shared file system 56 to store less critical data, the highly critical data in storage device 40(1) remains accessible even if the less critical data is not.

If the shared file system 56 determines that, based on the error list and on the member list, that the i/o error is a global data read/write i/o error on application data, then each of the nodes 12 having the shared file system 56 mounted thereon may continue to make the shared file system 56 available as there is no better alternative to fail over the application that uses the shared file system 56.

The following provides examples of techniques for implementing an adaptive data access error handling policy in accordance with exemplary embodiments of the present disclosure. In this example, node 12(1) may attempt to access metadata from storage device 40(1) based on a request from an application running on a client 20. The volume manager module 202 of the node 12(1) may send a data access read request to read metadata stored at the storage device 40(1). The storage device 40(1) may identify a i/o error on metadata, and may send an error message to the volume manager module 202.

After receiving the error message, the error handling module 204 of node 12(1) may determine whether to permit access to the shared file system 56 locally mounted thereon based on whether the i/o error is a local i/o error on metadata or is a global i/o error on metadata. To identify where the i/o error on metadata is global or local, the error handling module 204 may send a membership message to the other nodes 12(2)-(4) of the computer cluster 10 to identify whether any of the other nodes have the shared file system 56 mounted and whether any of the other nodes encounter the same i/o error on metadata. The other nodes 12(2)-(4) may attempt to read the same metadata from the storage device 40(1). In this example, all of the other nodes 12(2)-(4) are able to access the metadata. Each of the other nodes 12(2)-(4) may send a response message to the node 12(1) indicating that the other nodes 12(2)-(4) successfully accessed the metadata.

The error handling module 204 of the node 12(1) may generate a member list and an error list based on the response messages, and may forward the member list and the error list to the other nodes 12(2)-(4). Based on the error list and on the member list, the error handling module 204 of the node 12(1) identifies that the i/o error on metadata is an i/o error local to node 12(1). The node 12(1) may locally disable the shared file system 56 mounted thereon. The error handling module 204 of node 12(1) may inform the application of the client 20 requesting the metadata about the i/o error. The other nodes 12(2)-(4) may continue to make the shared file system 56 mounted thereon available to applications requesting access to the metadata from the storage device 40(1) that caused the i/o error on metadata at node 12(1).

The following describes an example similar to the one above, but with the i/o error being an i/o error on application data that is local to node 12(1). In this example, the error handling module 204 of node 12(1) determines that the i/o error on application data is local to node 12(1). The node 12(1) may then locally disable the shared file system 56 mounted to node 12(1). The error handling module 204 of node 12(1) may inform the application of the client 20 requesting the application data about the i/o error on application data. The nodes 12(2)-(4) may continue to make the shared file system 56 available as nodes 12(2)-(4) did not encounter this i/o error. The application requesting the application data may use nodes 12(2)-(4) to access the application data from the storage device 40(1).

The following describes an example similar to the one above, but with the shared file system 56 being mounted on nodes 12(1) and 12(2) of the computer cluster 10, but not on nodes 12(3) and 12(4). In this example, node 12(1) encounters an i/o error on application data when attempting to access application data from storage device 40(1). The node 12(1) may then determine whether to permit access to the shared file system 56 locally mounted thereon based on whether the i/o error on application data is a local data i/o error or is a global data i/o error. In this example, after receiving the response messages from the other nodes 12(2)-(4), to determine whether the i/o error on application data is a local data i/o error or is a global data i/o error, the error handling module 204 of node 12(1) generates the member list and the error list and forwards both lists to the error handling module 204 of node 12(2). Both of the error handling modules 204 of nodes 12(1) and 12(2) determine that nodes 12(1) and 12(2) are the only nodes of the computer cluster 10 that have the shared file system 56 mounted thereon. Thus, the i/o error on application data is a global data i/o error because all nodes that have the same shared file system 56 mounted thereon encounter the same i/o error on application data. Both of the nodes 12(1) and 12(2) maintain the local mounting of the shared file system 56.

In a further example, nodes 12(1)-(4) have the shared file system 56 mounted locally thereon and all nodes 12(1)-(4) encounter the same i/o error on application data. In this example, the nodes 12(1)-(4) continue to make the shared file system 56 available as there is not a better alternative to fail over the application that uses the shared file system 56.

Figure 7:
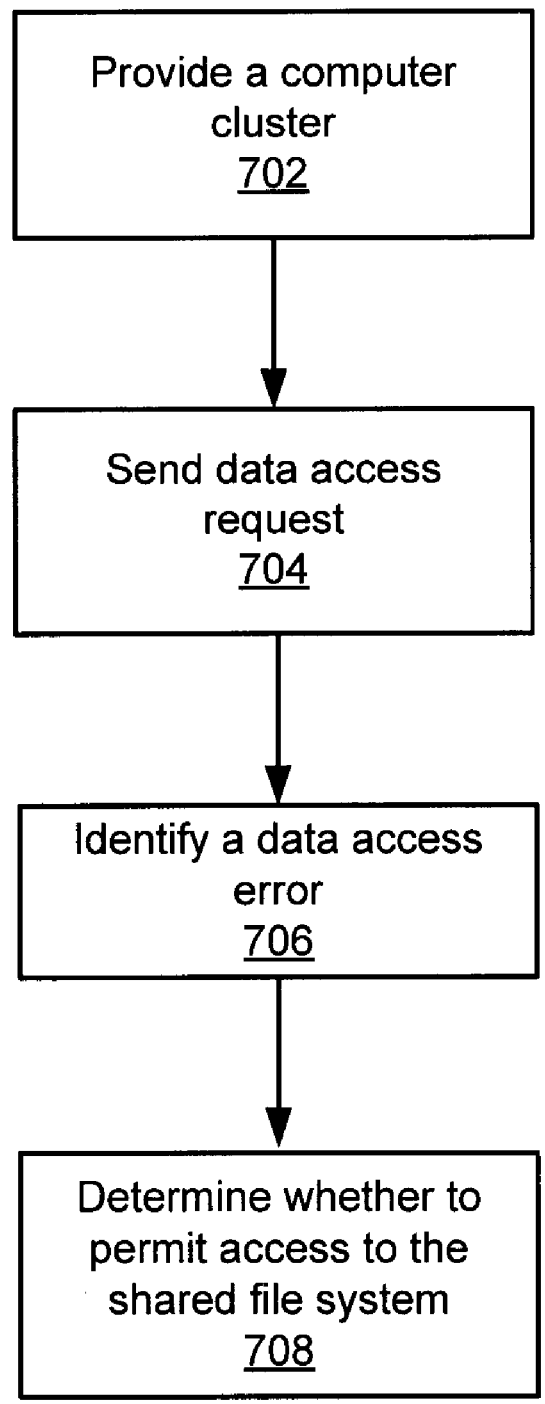
FIG. 7 shows a method of implementing an adaptive data access error handling policy in accordance with an embodiment of the present disclosure.

Referring to FIG. 7, there is shown a flow diagram of a method 700 of implementing an adaptive data access error handling policy in accordance with exemplary embodiments of the present disclosure. This exemplary method 700 is provided by way of example, as there are a variety of ways to carry out methods according to the present disclosure. The method 700 shown in FIG. 7 can be executed or otherwise performed by one or a combination of various systems. The method 700 is described below as carried out by the system 100 shown in FIG. 1 by way of example, and various elements of the system 100 are referenced in explaining the example method of FIG. 7. Each block shown in FIG. 7 represents one or more processes, methods, and/or subroutines carried in the exemplary method.

Referring to FIG. 7, the exemplary method 700 may begin at 702 and may include providing a computer cluster comprising a first node and a second node, a shared file system being locally mounted on the first node and on the second node. In an exemplary embodiment, a computer cluster 10 may be provided in system 100. The computer cluster 10 may include nodes 12(1) and 12(2). Each of nodes 12(1) and 12(2) may have a shared file system 56 locally mounted thereon. The flow diagram 700 may continue to 704.

In 704, the method 700 may include sending a data access request from the first node to a shared storage device. In an exemplary embodiment, an application of a client 20 may instruct a node 12(1) to send a data access request to shared storage device 40(1). The data access request may, for example, request to read metadata from, request to read application data from, request to write metadata to, and/or request to write metadata to the shared storage device 40(1). The method 700 may continue to 706.

In 706, the method may include identifying a data access error at the first node based on the data access request. In an exemplary embodiment, node 12(1) may identify a data i/o error based on the data access request. The node 12(1) may identify the data i/o error, for example, based on receiving an error message from the shared storage device 40(1), or may identify the data i/o error based on not receiving a response from the shared storage device 40(1) within a predetermined amount of time. The flow diagram 700 may continue to 708.

In 708, the method may include determining whether to permit access to the shared file system based on the data access error being a local data access error or a global data access error. In an exemplary embodiment, after the node 12(1) identifies the data i/o error, an error handling module 204 of the node 12(1) may broadcast a membership message to node 12(2). The membership message may include a data access request used by the node 12(1) to attempt to access the data. The node 12(2) may attempt to access the same data identified in the data access request. After the node 12(2) attempts to access the data identified in the data access request, the node 12(2) may respond to the membership message by sending a response message to the node 12(1). The response message may indicate whether the node 12(2) encountered the same data i/o error as experienced by the node 12(1). The node 12(1) may then identify if the data access error is local to node 12(1) or is global to all of the nodes 12. The node 12(1) may then determine whether to permit access to the shared file system 56 locally mounted thereon. For example, the node 12(1) may locally disable the shared file system 56, and other nodes 12 may or may not also disable the shared file system 56 depending on a type of the data access error and whether some or all of the other nodes 12 encounter the same data access error. The flow diagram 700 may then end.

Figure 8:
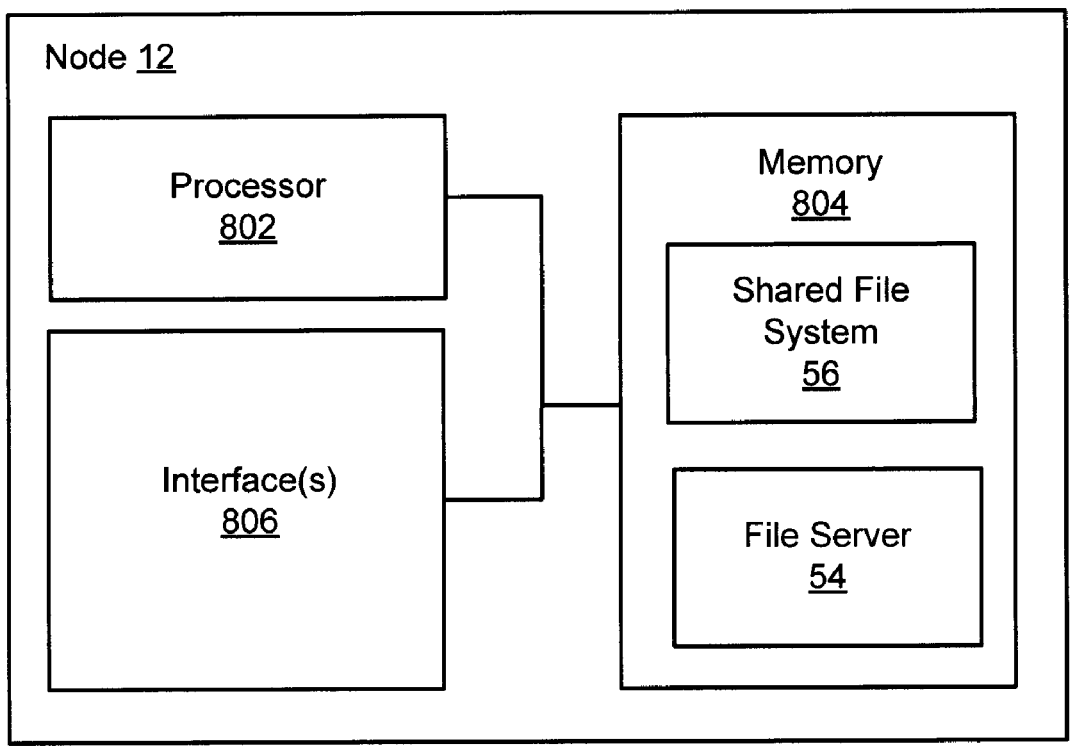
FIG. 8 shows a block diagram showing an example of a node that can be included in a computer cluster in accordance with an embodiment of the present disclosure.

Referring to FIG. 8, there is shown a block diagram showing an example of a node 12 that may be included in computer cluster 10 in accordance with an embodiment of the present disclosure. The node 12 may include at least one processor 802, a memory 804, and one or more interfaces 806. The processor 802 may be a microprocessor, PLD (Programmable Logic Device), ASIC (Application Specific Integrated Circuit), or other device configured to execute program instructions stored in memory 804. The memory 804 may include various types of RAM (Random Access Memory), ROM (Read Only Memory), Flash memory, MEMS (Micro Electro-Mechanical Systems) memory, and the like. The processor 802, the memory 804, and the interface 806 may be coupled to send and receive data and control signals by one or more buses or other interconnects.

The interface 806 may include network interfaces to various networks and/or interfaces to various peripheral buses. The interface 806 may include an interface to one or more storage devices 40 on which a storage volume 38 is implemented. The interface 806 may also include an interface to a network, for use in communicating with other nodes and/or for use in communicating with networked storage devices. For example, interface 806 may be used to communicate heartbeat messages with other nodes, to communicate with clients, and/or to access a storage volume via a storage area network.

The memory 804 stores the data and program instructions, executable by processor 802, to implement one or more applications. In this example, the memory 804 stores data and program instructions implementing the file server 54 and the shared file system 56. The program instructions and data implementing the file server 54 and the shared file system 56 may be stored on various computer readable media such as memory 804. In some embodiments, such software is stored on a computer readable medium such as a Compact Disc (CD), Digital Versatile Disc (DVD), hard disk, optical disk, tape device, floppy disk, and the like. In order to be executed by the processor 802, the instructions and data implementing the file server 54 and the shared file system 56 may be loaded into the memory 804 from the other computer readable medium. Such instructions and/or data may also be transferred to node 12 for storage in memory 804 via a network such as the Internet or upon a carrier medium. In some embodiments, a computer readable medium is a carrier medium such as a network and/or a wireless link upon which signals such as electrical, electromagnetic, or digital signals, on which the data and/or instructions implementing load the file server 54 and the shared file system 56 are encoded, are conveyed.

At this point it should be noted that systems and methods in accordance with the present disclosure as described above typically involve the processing of input data and the generation of output data to some extent. This input data processing and output data generation may be implemented in hardware or software. For example, specific electronic components may be employed in a clustered file system or similar or related circuitry for implementing the functions associated with serving data from a shared storage devices in accordance with the present disclosure as described above. Alternatively, one or more processors operating in accordance with stored instructions may implement the functions associated with adaptively handling data access errors when attempting to access data from shared storage devices in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system for implementing an adaptive data access error handling policy comprising:
    a shared storage device communicatively coupled to a network; and
    a computer cluster communicatively coupled to the network, the computer cluster comprising a plurality of nodes each mounting a shared file system thereon, a first node of the plurality of nodes to send a data access request to the shared storage device, to identify a data access error associated with the data access request, and to determine whether to permit access to the shared file system based on the data access error being a local data access error or a global data access error.

2. The system of claim 1, wherein the first node sends a membership message to all of the plurality of nodes based on the identified data access error, and receives at least one response message at the first node from at least one other node of the plurality nodes, the response message indicating whether the at least one other node encountered the identified data access error.

3. The system of claim 2, wherein the first node determines whether the data access error is global or is local based on the at least one response message.

4. The system of claim 1, wherein the data access error is global if all nodes of the plurality of nodes of the computer cluster encounter the data access error.

5. The system of claim 1, wherein the data access error is local if some but not all of the plurality of nodes of the computer cluster encounter the data access error.

6. A method for implementing an adaptive data access error handling policy comprising the steps of:
    providing a computer cluster comprising a first node and a second node, a shared file system being mounted on the first node and on the second node;
    sending a data access request from the first node to a shared storage device;
    identifying a data access error at the first node based on a response to the data access request; and
    determining whether to permit access to the shared file system based on the data access error being a local data access error or a global data access error.

7. The method of claim 6, wherein if the data access error is an access error on metadata, further comprising locally disabling access to the shared file system mounted on the first node.

8. The method of claim 6, wherein the data access error is a global if all nodes of the computer cluster encounter the data access error.

9. The method of claim 6, wherein the data access error is local if some but not all nodes of the computer cluster encounter the data access error.

10. The method of claim 6, wherein if the data access error is a data access error on application data that is local to the first node, locally disabling access to the shared file system mounted on the first node.

11. The method of claim 6, wherein the computer cluster further comprises a third node.

12. The method of claim 11, wherein the shared file system is not mounted on the third node.

13. The method of claim 12, wherein if the first node and the second node encounter the data access error and the data access error is an data access error on application data, maintaining mounting of the shared file system on the first node and on the second node.

14. The method of claim 6, wherein if the data access error is a global data access error on application data, maintaining mounting of the shared file system on the first node and on the second node.

15. The method of claim 6, further comprising:
   sending a membership message to other nodes of the computer cluster, the membership message including a file system identifier associated with the shared file system; and
   receiving a response message to the membership message from at least one of the other nodes.

16. The method of claim 15, further comprising generating an error list of nodes, based on the response message, identifying all nodes of the computer cluster that encounter the data access error.

17. The method of claim 15, further comprising generating a member list of nodes, based on the response message, identifying all nodes that have the shared file system mounted thereon.

18. At least one processor readable storage medium for storing a computer program of instructions configured to be readable by at least one processor for instructing the at least one processor to execute a computer process for performing the method as recited in claim 6.

19. An article of manufacture for implementing an adaptive data access error handling policy, the article of manufacture comprising:
   at least one processor readable storage medium; and
      instructions stored on the at least one storage medium;
   wherein the instructions are configured to be readable from the at least one storage medium by at least one processor and thereby cause the at least one processor to operate so as to:
      mount a shared file system on a first node and on one or more other nodes;
      send a data access request from the first node to a storage device;
      identify a data access error at the first node associated with the data access request; and
      determine whether to permit access to the shared file system based on the data access error being a local data access error or a global data access error.

* * * * *